(12) United States Patent
Bergers et al.

(10) Patent No.: US 11,427,502 B2
(45) Date of Patent: Aug. 30, 2022

(54) ADHESION PROMOTERS, GLASS SURFACES INCLUDING THE SAME, AND METHODS FOR MAKING THE SAME

(71) Applicant: APOGEE ENTERPRISES, INC., Minneapolis, MN (US)

(72) Inventors: Matthew Bergers, Lakeville, MN (US); Brad Erickson, Owatonna, MN (US)

(73) Assignee: Apogee Enterprises, Inc., Minneapolis, MN (US)

( * ) Notice: Subject to any disclaimer, the term of this patent is extended or adjusted under 35 U.S.C. 154(b) by 250 days.

(21) Appl. No.: 16/213,975

(22) Filed: Dec. 7, 2018

(65) Prior Publication Data

US 2019/0177214 A1    Jun. 13, 2019

Related U.S. Application Data

(60) Provisional application No. 62/596,243, filed on Dec. 8, 2017.

(51) Int. Cl.
  *B32B 15/04* (2006.01)
  *B32B 17/06* (2006.01)
  (Continued)

(52) U.S. Cl.
  CPC ............ *C03C 17/42* (2013.01); *B32B 17/06* (2013.01); *B32B 17/10036* (2013.01); *B32B 17/10174* (2013.01); *B32B 17/10201* (2013.01); *B32B 17/10743* (2013.01); *B32B 17/10816* (2013.01); *B32B 17/10908* (2013.01); *B32B 17/10981* (2013.01); *C03C 17/22* (2013.01); *C03C 17/245* (2013.01); *C03C 17/2456* (2013.01); *B32B 2605/006* (2013.01); *C03C 2217/21* (2013.01); *C03C 2217/212* (2013.01); *C03C 2218/156* (2013.01)

(58) Field of Classification Search
  CPC ............ C03C 17/2456; C03C 2217/21; C03C 2217/212
  USPC ................................. 428/426, 428, 432, 688
  See application file for complete search history.

(56) References Cited

U.S. PATENT DOCUMENTS 5,624,760 A * 4/1997 Collins ................... C03C 17/22
                                                              428/192
5,846,279 A * 12/1998 Nomura ................. C03C 17/30
                                                              65/30.1
(Continued)

FOREIGN PATENT DOCUMENTS

JP        S6061252 U     4/1985
JP        2016180719 A   10/2016
(Continued)

OTHER PUBLICATIONS

PCT, "International Search Report and Written Opinion", Application No. PCT/US2018-064606, dated Mar. 11, 2019, 19 pages.

(Continued)

*Primary Examiner* — Lauren R Colgan
(74) *Attorney, Agent, or Firm* — Dorsey & Whitney LLP (57) ABSTRACT

A light transmissive substrate having a coating is disclosed. The coating is formed of an adhesion promoter that includes a metal, a metal oxide, or a metal nitride. A laminate including a coated substrate is also disclosed. A method of coating a substrate is further disclosed.

10 Claims, 4 Drawing Sheets

(51) Int. Cl.
*C03C 17/42* (2006.01)
*B32B 17/10* (2006.01)
*C03C 17/245* (2006.01)
*C03C 17/22* (2006.01)

(56) References Cited

U.S. PATENT DOCUMENTS

| | | | | |
|---|---|---|---|---|
| 6,027,766 | A * | 2/2000 | Greenberg | C03C 17/23 427/226 |
| 6,114,043 | A * | 9/2000 | Joret | C03C 17/225 428/428 |
| 10,273,573 | B2 * | 4/2019 | Myli | C23C 14/564 |
| 10,578,777 | B2 * | 3/2020 | Bellman | G02B 1/14 |
| 2002/0155299 | A1 * | 10/2002 | Harris | C03C 17/2456 428/428 |
| 2003/0027000 | A1 * | 2/2003 | Greenberg | C23C 16/40 428/432 |
| 2003/0039843 | A1 * | 2/2003 | Johnson | C03C 17/002 428/432 |
| 2004/0032658 | A1 | 2/2004 | Fleming | |
| 2004/0069770 | A1 | 4/2004 | Cary et al. | |
| 2005/0016835 | A1 * | 1/2005 | Krisko | C03C 17/3417 204/192.12 |
| 2007/0048519 | A1 | 3/2007 | Anderson et al. | |
| 2007/0092706 | A1 | 4/2007 | Pesek et al. | |
| 2007/0111012 | A1 * | 5/2007 | Rimmer | C03C 17/36 428/432 |
| 2007/0154694 | A1 * | 7/2007 | Samuels | G10K 11/168 428/216 |
| 2007/0196630 | A1 | 8/2007 | Hayes et al. | |
| 2008/0023063 | A1 | 1/2008 | Hayes et al. | |
| 2008/0210287 | A1 * | 9/2008 | Volpp | B32B 17/10036 136/244 |
| 2010/0112354 | A1 * | 5/2010 | Hayes | B32B 17/1055 428/412 |
| 2010/0154867 | A1 | 6/2010 | Bennison et al. | |
| 2010/0167061 | A1 | 7/2010 | Bennison et al. | |
| 2010/0221575 | A1 | 9/2010 | Stull | |
| 2010/0297413 | A1 | 11/2010 | Hartig | |
| 2011/0180906 | A1 | 7/2011 | Wessels et al. | |
| 2012/0085482 | A1 | 4/2012 | Cadwallander et al. | |
| 2012/0202073 | A1 * | 8/2012 | Dusoulier | C03C 17/3686 428/428 |
| 2013/0056049 | A1 | 3/2013 | Nakata et al. | |
| 2013/0063802 | A1 | 3/2013 | Varaprasad et al. | |
| 2013/0167911 | A1 | 7/2013 | Ikenaga et al. | |
| 2013/0224456 | A1 | 8/2013 | Moran et al. | |
| 2014/0014170 | A1 * | 1/2014 | Whittemore, IV | H01L 31/06 136/256 |
| 2014/0087085 | A1 * | 3/2014 | Gruenler | C03C 17/245 427/446 |
| 2015/0132538 | A1 | 5/2015 | Cleary et al. | |
| 2015/0152558 | A1 * | 6/2015 | Walther | C23C 28/04 428/216 |
| 2015/0202846 | A1 | 7/2015 | Byker et al. | |
| 2016/0062001 | A1 | 3/2016 | Wiersema et al. | |
| 2016/0082705 | A1 | 3/2016 | Fisher et al. | |
| 2016/0159042 | A1 | 6/2016 | Cui et al. | |
| 2016/0282695 | A1 | 9/2016 | Agrawal et al. | |
| 2017/0327416 | A1 * | 11/2017 | Miyamoto | C03C 17/34 |

FOREIGN PATENT DOCUMENTS

| | | |
|---|---|---|
| WO | 2009008856 A1 | 1/2009 |
| WO | 2012038718 A2 | 3/2012 |

OTHER PUBLICATIONS

International Preliminary Report on Patentability received for International Application No. PCT/US2018/064606, dated Jun. 18, 2020, 11 page.

"Laminated Glass Interlayers; Introduction to Laminated Glass Interlayers; Guidance to Raise Awareness on Which Laminated Glass Interlayers Types to Use", Jun. 2019, 9 pages, www.cpni.gov.uk, Crown.

"Paul Andreu's Shanghai Oriental Art Center Uses SentryGlas Ionoplast Interlayer for "Magical" Facades", Case Study, 6 pages, 2014, Kuraray.

Santarsiero, et al., "Laminated connections for structural glass applications under shear loading at different temperatures and strain rates", Construction and Building Materials, vol. 128, Dec. 15, 2016, pp. 214-237, Elsevier.

Schneider, "Next Generation Ionoplast for Improved Lamination", 7 pages, 2019, glassonweb.com.

Schneider, "Performance Comparison of Structural Interlayers", Challenging Glass 6, Conference on Architectural and Structural Applications of Glass, May 2018, 6 pages.

Ungureanu, "Advanced Design of Glass Structures; Lecture 3—Laminated Glass and Interlayers", European Erasmus Mundus Master Course, Sustainable Constructions Under Natural Hazards and Catastrophic Events, 26 pages.

* cited by examiner

ADHESION PROMOTERS, GLASS SURFACES INCLUDING THE SAME, AND METHODS FOR MAKING THE SAME

CROSS-REFERENCE TO RELATED APPLICATION

This application claims the benefit under 35 U.S.C. § 119 to U.S. Provisional Application No. 62/596,243, filed Dec. 8, 2017 and entitled "ADHESION PROMOTERS, GLASS SURFACES INCLUDING THE SAME, AND METHODS FOR MAKING THE SAME," the entirety of which is hereby incorporated by reference for all purposes.

BACKGROUND

Laminates of visible light transmissive substrates are employed in numerous industries including construction and automotive. In construction, they can provide structural support, aesthetic appeal, UV blocking, and sound insulation. The laminates are strong and stiff while retaining clarity.

These laminates are often referred to as "safety glass" because the glass generally does not break apart into sharp pieces that could cause injury or damage. Instead, the glass remains bonded after impact. The ability of cracked or broken pieces to stay together is attributed to at least one interlayer disposed between two rigid substrates.

Interlayers constructed of ionomers (ionic polymers) can provide superior strength, stiffness, and clarity to resulting laminates. The ability of an ionomeric interlayer to remain adhered to a substrate in a laminate depends, in part, on the environmental conditions in which the laminate is used. Ionomer-containing laminates used in buildings in hot and humid environments are susceptible to the ingress of moisture, which weakens the adhesion and may lead to delamination. Delamination impairs mechanical, optical, and acoustic performance. The initial application of an ionomeric layer to a substrate can also be weak, as ionomers have low adhesion to some substrates such as the air side of float glass.

Accordingly, there is a need in the industry for a coating for a visible light transmissive substrate that provides improved adhesion of at least ionomeric layers used in the construction of coated substrates and substrate laminates.

SUMMARY

Embodiments of the invention relate to adhesion promoter coatings or primer coatings for adhering ionomeric layers to substrates, such as float glass.

An example embodiment of a coated substrate including a light-transmissive substrate and a coating disposed on the substrate is disclosed. The coating includes an adhesion promoter that includes at least one of a metal, a metal oxide, and a metal nitride. The coating has a thickness of about 10 Å to about 1000 Å.

An example embodiment of a light transmissive laminate is disclosed. The laminate includes at least a first light transmissive substrate and a second light transmissive substrate. The laminate also includes a coating disposed on at least a portion of at least the first major surface of at least the first substrate. The coating includes an adhesion promoter including at least one of a metal, a metal oxide, and a metal nitride. The laminate also includes an ionomeric layer disposed on the coating.

An example embodiment of a method of coating a substrate is disclosed. The method includes sputtering an adhesion promoter onto at least a portion of at least one major surface of the substrate. The adhesion promoter includes at least one of a metal, a metal oxide, and a metal nitride.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the disclosure relate to adhesion promoter coatings. More particularly, embodiments relate to adhesion promoter coatings that promote adhesion between ionomeric interlayers and substrates having the coating. The coated substrates and ionomeric interlayers may form laminates.

Coated Substrates

Figure 1:
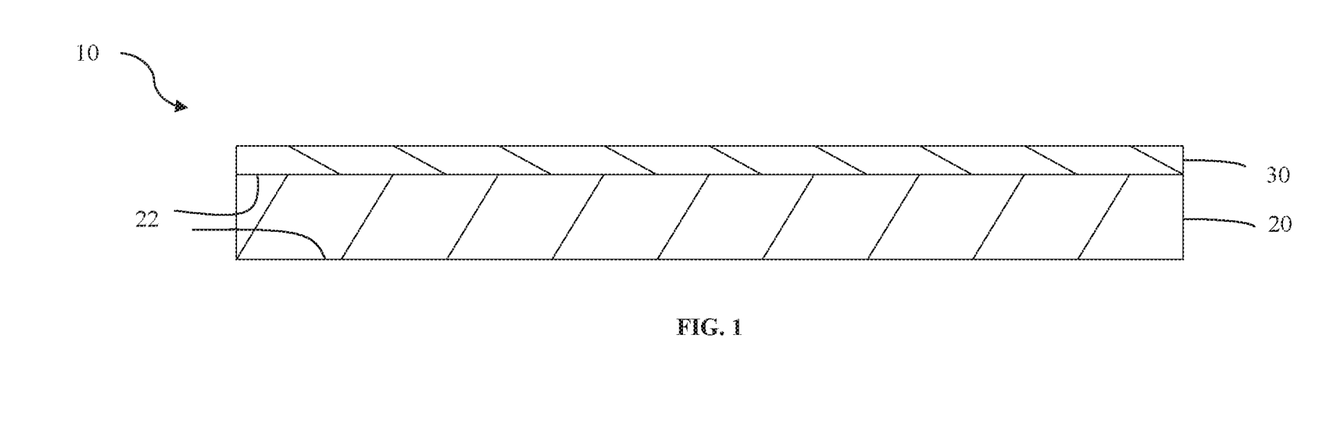
FIG. 1 is a schematic of a coated substrate according to embodiments.

FIG. 1 is a schematic of a coated substrate 10. The coated substrate 10 includes a substrate 20 and a coating 30 disposed thereon. The substrate 20 may be any transparent, substantially transparent, or light transmissive substrate such as glass, quartz, any plastic or organic polymeric substrate, or any other suitable material or combination of materials. In one embodiment, the substrate 20 is float glass. Float glass is a sheet of glass made by floating a mixture of molten raw materials on a bath of molten metal, such as tin, lead, or an alloy having a low melting point. The raw materials may include silicon dioxide (silica), borosilicate, sodium carbonate (soda), lime, dolomite, aluminum oxide, or sodium sulfate. In one example, the raw materials include a mixture of at least silicon dioxide, sodium carbonate, and lime (soda-lime glass). The molten glass is removed from the metal bath and cooled. The process yields a glass sheet having a surface that was in contact with the metal, herein referred to as the "tin side" or "tin surface," and an opposing surface that was not in contact with the metal, herein referred to as the "air side" or "air surface." Float glass may be characterized by very smooth surfaces, very flat surfaces, and/or uniform thickness.

In some embodiments, the substrate 20 is borosilicate. In some embodiments the substrate 20 is an aluminosilicate or alkali-aluminosilicate glass such as Gorilla® glass (Corning, Corning, N.Y.), Dragontail glass (Asahi Glass Co., Tokyo, Japan), or Xensation® glass (Schott AG, Mainz, Germany).

The substrate may be formed as a sheet or may have a sheet-like shape. The sheet or sheet-like shape may have one or major surfaces or sides 22, such as the faces of the sheet. A float glass substrate may have a major surface that is the air side and a major surface that is the tin side.

The substrate 20 may be a window pane or panel. The substrate 20 may have a thickness of about 1 mm to about 30 mm, about 1 mm to about 27.5 mm, about 1 mm to about 25 mm, about 1 mm to about 20 mm, about 1 mm to about 15 mm, about 1 mm to about 10 mm, about 1 mm to about 5 mm, about 2 mm to about 30 mm, about 5 mm to about 30 mm, about 10 mm to about 30 mm, about 15 mm to about 30 mm, about 20 mm to about 30 mm, about 2 mm to about 26 mm, or about 10 mm to about 12 mm The coating 30 includes an adhesion promoter. In some embodiments, the coating 30 is an adhesion promoter. The adhesion promoter may help to securely bond the substrate 20 to an ionomeric layer 40 (see FIGS. 2A-4) and may help to reduce or prevent weakening of the bond or delamination. The adhesion promoter may include one or more metallic materials such as metals (e.g., pure metals or alloys; as used herein "metal" includes metalloids such as silicon), metal oxides, or metal nitrides. Metallic materials may include titanium, zinc, tin, silicon, indium, bismuth, titanium, hafnium, zirconium, and alloys thereof, and oxides or nitrides thereof. In some examples, the metal, metal oxide, or metal nitride is silicon, tin, titanium, zinc, silicon dioxide, tin oxide, titanium oxide, zinc oxide, silicon nitrides (which may have variable oxidation states and are designated, in general, SiNx) including silicon mononitride (SiN), silicon nitride ($Si_3N_4$) tin nitride, titanium nitride, zinc nitride, or combinations thereof. Reference to metal oxides includes fully oxidized metal oxides as well as species that can form an agglomeration and have partial oxidation states. These can be designated as a M(metal)Ox(oxide), such as TiOx, SiOx, SnOx, etc. The metallic material may be a dielectric material.

The coating 30 may be transparent or substantially transparent to at least a portion of visible light incident thereto.

The coating 30 may be formed or provided in the form of a film. The thickness of film may be uniform, or may vary across its width or length.

With reference to FIG. 1, the coating 30 is applied to at least one side or surface 22 of a substrate 20. As shown in FIGS. 2A-4, the coating 30 may be applied to the air side 22a, the tin side 22b, or both sides 22 of a substrate 20. The coating 30 may be applied directly to the substrate 20. The coating 30 may be applied in one layer or more than one layer.

The coating 30 may be deposited on the substrate 20 or otherwise attached thereto. The coating 30 may have a thickness of about 10 Å to about 1000 Å, about 10 Å to about 750 Å, about 10 Å to about 500 Å, about 10 Å to about 400 Å, about 10 Å to about 300 Å, about 10 Å to about 200 Å, about 10 Å to about 100 Å, about 50 Å to about 1000 Å, about 100 Å to about 1000 Å, about 200 Å to about 1000 Å, about 300 Å to about 1000 Å, about 400 Å to about 1000 Å, about 500 Å to about 1000 Å, about 600 Å to about 1000 Å, about 700 Å to about 1000 Å, about 800 Å to about 1000 Å, about 50 Å to about 200 Å, about 100 Å to about 200 Å, or about 100 Å to about 180 Å.

The coating 30 may be applied to the substrate 20 by sputtering as described below.

Methods of Forming Coated Substrates

A variety of techniques may be used to apply the coating 30 described herein. An example of a method of disposing a coating 30 on a substrate 20 having a surface 22 is provided. This surface 22 may be optionally prepared by suitable washing or chemical preparation. A coating 30 may be deposited on the surface 22 of the substrate 20 to form a coated substrate 10. The coating 30 may be deposited in one or more of a series of discrete layers, or as a thickness of graded film, or combinations thereof. The coating 30 can be deposited using any suitable thin film deposition technique(s).

In one example of an embodiment, sputtering may be used to deposit or apply one or more portions of the coating 30 on the substrate 20. As is known, sputtering is a technique used to deposit thin films of a material onto a surface or substrate. By first creating a gaseous plasma and then accelerating the ions from this plasma into some source material (e.g., a target), the source material is eroded by the arriving ions via energy transfer and is ejected in the form of neutral particles, either individual atoms or clusters of atoms or molecules. As these neutral particles are ejected, they travel in a straight line unless they come into contact with something, whether it is another particle or a nearby surface. A substrate placed in the path of these ejected particles will be coated by a thin film of the source material or target. As is known, a gaseous plasma is a dynamic condition where neutral gas atoms, ions, electrons, and photons exist in near balanced state simultaneously. One can create this dynamic condition by metering a gas, such as argon or oxygen, into a pre-pumped vacuum chamber, allowing the chamber pressure to reach a specific level, and then introducing a live electrode into this low-pressure gas environment using a vacuum feedthrough. An energy source, such as RF, DC, AC, or MW may be used to feed and thus maintain the plasma state as the plasma loses energy into its surroundings. The type of sputtering used may be diode sputtering, magnetron sputtering, confocal sputtering, direct sputtering, or other suitable techniques.

In an example method of depositing the coating 30, magnetron sputtering vacuum deposition is used. Magnetron sputtering involves transporting a substrate 20 through a series of low-pressure zones in which the coating 30 is applied or layers thereof are sequentially applied. Thus, the metallic coating or layers thereof are sputtered from metallic sources or targets, which may occur in an inert atmosphere. To deposit an oxide- or nitride-containing coating, the target may be formed of the oxide or nitride, respectively, itself. Alternatively, the oxide-containing coating may also be applied by sputtering a metal target in a reactive atmosphere. In this regard, for example to deposit zinc oxide, a zinc target can be sputtered in an oxidizing atmosphere. The thickness of the deposited coating 30 or layer thereof may be controlled by varying the speed of the substrate 20 and/or by varying the power placed upon the targets. In alternative embodiments of a method for depositing thin film on a substrate 20, physical vapor deposition or plasma chemical vapor deposition may be used. Plasma chemical vapor deposition involves the decomposition of gaseous sources via a plasma and subsequent film formation onto solid surfaces, such as glass substrates. The film thickness can be adjusted by varying the speed of the substrate as it passes through a plasma zone and/or by varying the power and/or gas flow rate within each zone.

Figure 5:
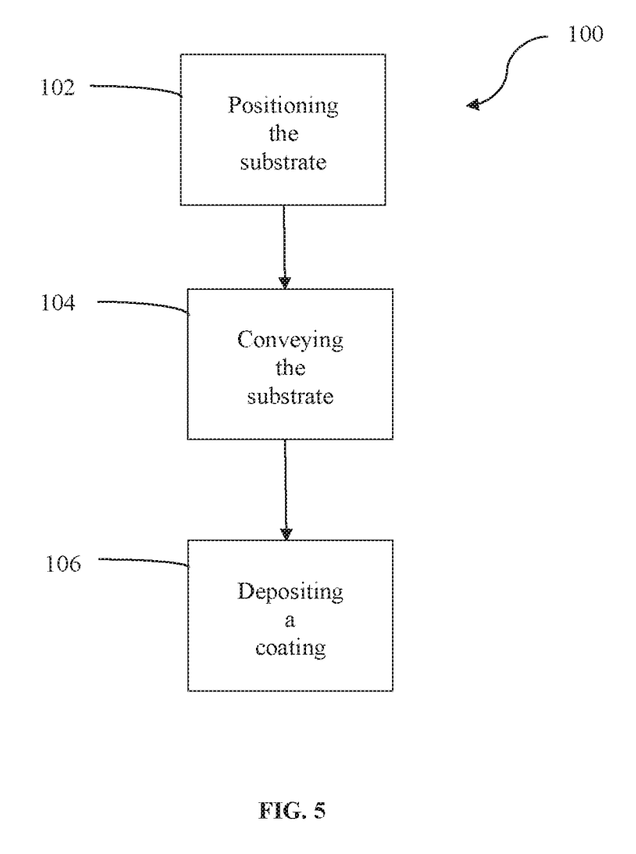
FIG. 5 is a flow diagram of a method of making the coated substrate of FIG. 1.

FIG. 5 is a flow diagram of a method 100 of coating a substrate 20 to form a coated substrate 10. In an example of a method 100 for depositing a coating 30, a coater is used to deposit a coating 30 on a substrate 20. A suitable coater may be an architectural glass coater available from Von Ardenne (Dresden, Germany). Generally, a coater with the ability to achieve vacuum of approximately $10^{-6}$ torr may be desirable.

The example method 100 includes the step 102 of positioning the substrate 20 at the beginning of the coater and the step 104 of conveying the substrate 20 to a coat zone. The substrate 20 may be conveyed by any suitable means such as mechanical, computerized, or by hand. The substrate 20 may be conveyed by a conveyor assembly.

The method 100 also includes at least one step 106 of depositing a coating 30 on the substrate 20. The coating 30, or a layer thereof, is deposited while the substrate 20 is positioned in the coat zone. The coat zone may include one or more sputtering chambers or bays adapted to collectively deposit a coating or layer thereof on the substrate 20. In each bay is mounted one or more targets including a sputterable target material. In the examples provided herein, the target may be a metal, metal oxide, or metal nitride. The number and type of target, e.g., planar or cylindrical or the like, can be changed for purposes suitable to the manufacture or otherwise as desired. The coat zone may be provided with an inert atmosphere. In one example, the inert atmosphere includes argon, although alternative inert gases may be used.

The substrate 20 is conveyed beneath the metal, metal oxide, or metal nitride target, thereby depositing the metal, metal oxide, or metal nitride as a coating 30, or layer thereof, having a thickness of about 10 Å to about 1000 Å. The coating 20 may be deposited on either the air side 22a or the tin side 22b of the substrate 20.

In some implementations, step 106 is repeated as necessary to deposit additional layers of the coating 30.

In some implementations, the method 100 is repeated in order to apply the coating 30 to the other of the air side 22a or the tin side 22b of the substrate 20 such that both sides 22 are coated.

While magnetron sputtering is specifically described, the coating 30 may be applied by other methods as described above. Alternatively, the coating 30 or properties thereof may be integrally formed with the substrate 20.

The described coatings and methods of applying the coatings have benefits over other adhesion-promoter coatings and methods of applying the same to a substrate. Compared to an adhesion promoter that includes γ-aminopropyltriethoxysilane, the described adhesion-promoter coatings are less toxic, have fewer short- and long-term health effects, and require less environmental and personal monitoring. The described coatings can be deposited using existing equipment; novel or unique equipment is not required to practice the described methods. The coating can be deposited mechanically, which is more efficient than methods of application by hand. Mechanical deposition also provides more consistent coverage, less (or no) streaking, and less (or no) introduction of foreign debris than application by hand. Overall, the coatings and methods described herein provide coated substrates more safely, more efficiently, more reliably, more easily, less expensively, and with better performance than other adhesion-promoter coatings and methods of applying the same.

Laminates Including Coated Substrates

The coated substrates 10 described above may be used to form part of a laminate 50. With reference to FIGS. 2A-4, a laminate 50 includes at least one substrate 20, at least one coating 30, and at least one ionomeric layer 40.

The ionomeric layer 40 includes an ion-containing polymer or resin, herein referred to as an "ionomer." The ionomer may be a copolymer in which about 15% or fewer of the repeating monomer units have a pendent ionic group. The ionomer may be a thermoplastic polymer. The ionomer may be a neutralized or partially neutralized acid-ethylene copolymer or a derivative thereof. The acid-ethylene copolymer may obtained by the copolymerization of ethylene and an α,β-unsaturated carboxylic acid. The acid may be methacrylic acid or acrylic acid. The acid-ethylene copolymer may be ethylene-co-methacrylic acid (EMAA). A metallic ion, such as sodium or zinc, may be used to neutralize the acid copolymer.

In one example, the ionomer is a water insoluble salt of a polymer of ethylene and methacrylic acid or acrylic acid containing about 14-24% by weight of the acid and about 76-86% by weight of ethylene and having about 10-80% of the acid neutralized with a metallic ion, such as a sodium ion.

Electrostatic forces may cause the ionic groups of ionomers to associate, such as to produce nanometer-sized ion-rich aggregates dispersed in the polymer matrix. The morphology of crystallizable ionomers may include ionic aggregates, ethylene crystals, and non-crystalline carboxylic acid segments. Associations and aggregations may decrease as the temperature of the ionomer is increased.

Ionomeric layers 40 may be formed, such as into sheets, by known methods such as extrusion, co-extrusion, solution casting, compression molding, injection molding, or melt blowing. Additives such as colorants, UV stabilizers, or antioxidants may be added to the ionomer, such as during extrusion.

In one example, the ionomer is melted, extruded through a die, and pulled through calendar rolls to form ionomer resin sheets. Sheets may have a rough surface, which may allow more air to be removed during lamination.

Ionomeric sheets may be characterized by any one or more of high transparency (e.g., ≥90%), low haze (e.g., ≤5%), toughness, durability, high impact resistance, glass cut-through resistance, high modulus, high tear strength, and strong adhesion directly to glass. Without being limited to any mechanism or mode of action, high melt viscosity may hinder the formation of large crystallites, which helps achieve high transparency and low haze. Alternatively or additionally, a high percent of methacrylic acid content and a low percent of ethylene content may decrease the formation of crystallites, which helps achieve high transparency and low haze.

The ionomeric layer 40 may be a commercially available ionomeric resin sheet such as Surlyn®, SentryGlas®, or SentryGlas® Plus (DuPont, Wilmington, Del.; Kuraray, Tokyo, JP).

The ionomeric layer 40 may be disposed on a substrate 20, which may be a coated substrate 10, to form a laminate 50 or a portion thereof.

With reference to FIGS. 2A-4, laminates 50 may include a plurality of substrates 20, at least one coating 30, and at least one ionomeric layer 40. In the embodiment depicted in FIG. 2A, the laminate 50 include two substrates 20 adhered to each other by a coating 30 and an ionomeric layer 40. The coating 30 is disposed on the air side 22a of a first float glass substrate 20a. The ionomeric layer 40 is disposed between the coating 30 and a surface 22 of a second substrate 20b. The second substrate 20b may be float glass and the surface 22 of the second substrate 20b may be either the air side 22a or the tin side 22b.

Figure 2A:
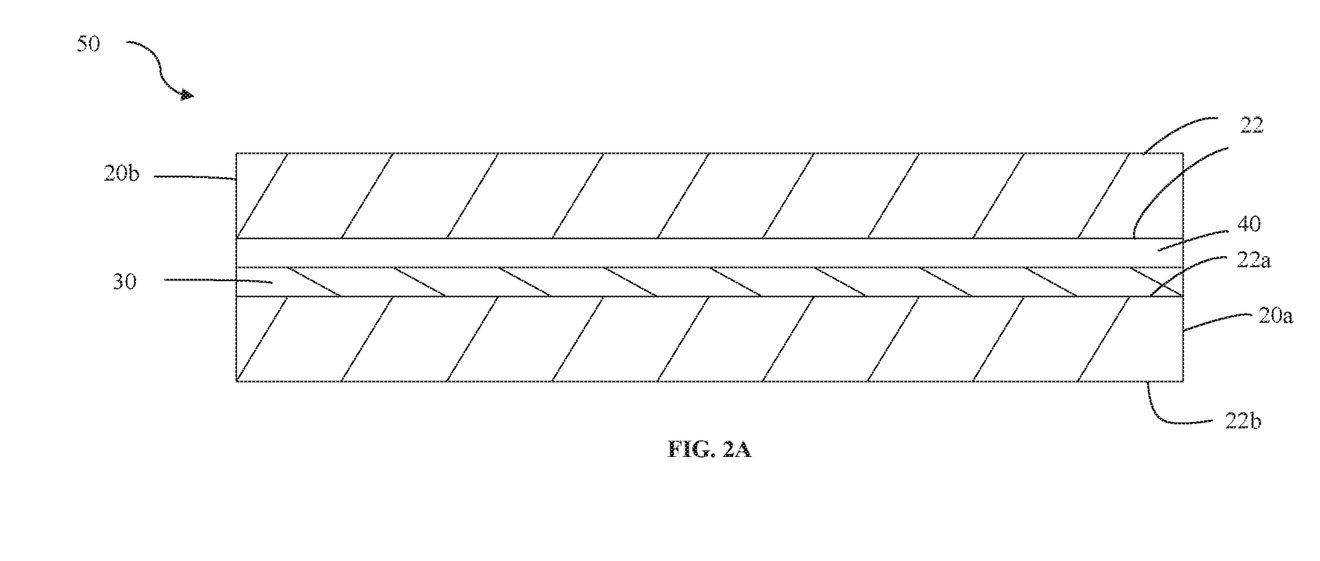
FIGS. 2A-2B are schematics of laminates including a coated substrate of FIG. 1 according to embodiments.
Figure 2B:
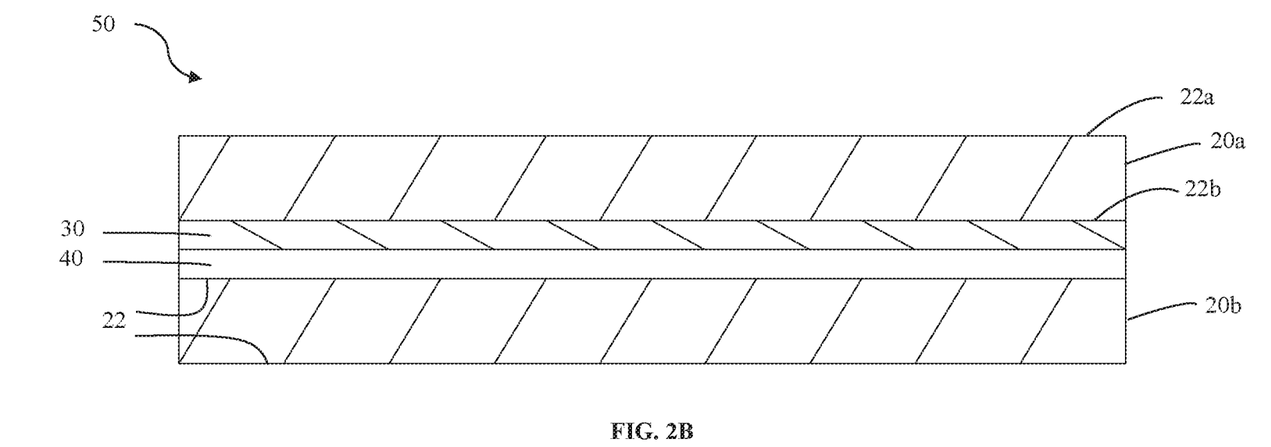

In the embodiment depicted in FIG. 2B, the laminate 50 includes the same components as in FIG. 2A, but the coating 30 is disposed on the tin side 22b of the first float glass substrate 20a. The ionomeric layer 40 is disposed between the coating 30 and a surface 22 of a second substrate 20b, as in FIG. 2A. The second substrate 20b may be float glass and the surface 22 of the second substrate 20b may be either the air side 22a or the tin side 22b.

Figure 3:
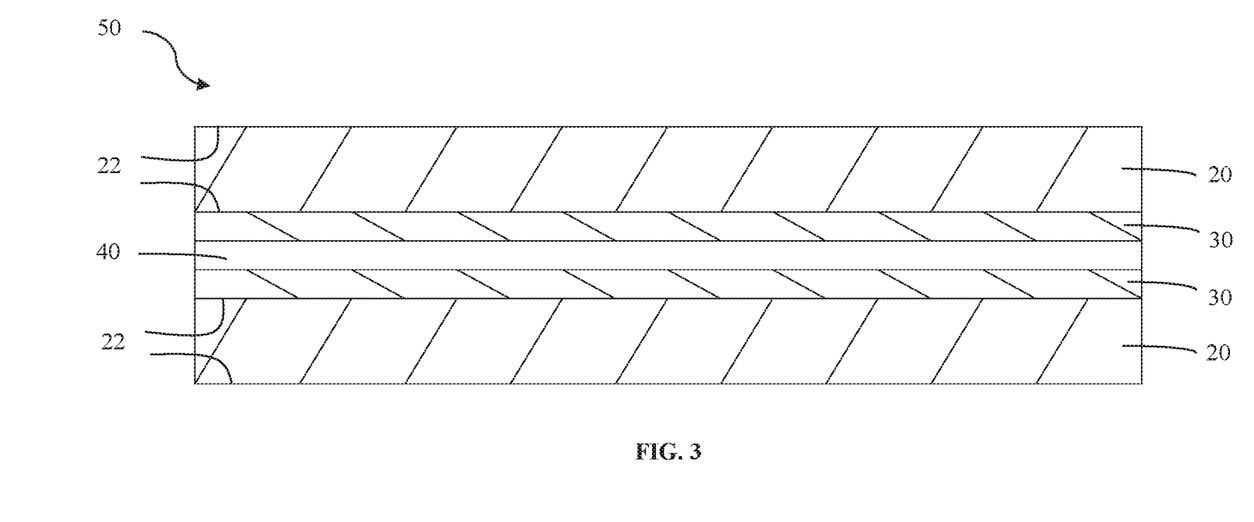
FIG. 3 is a schematic of a laminate including a coated substrate of FIG. 1 according to embodiments.

In the embodiment depicted in FIG. 3, the laminate 50 includes two substrates 20, each coated on a side 22 with a coating 30. One or both of the substrates 20 may be constructed of float glass and the coating 30 may be applied on the air side 22a of each substrate 20, the tin side 22b of each substrate 20, or the air side 22a of one substrate 20 and the tin side 22b of the other substrate 20. An ionomeric layer 40 is disposed between the coated substrates 10.

Figure 4:
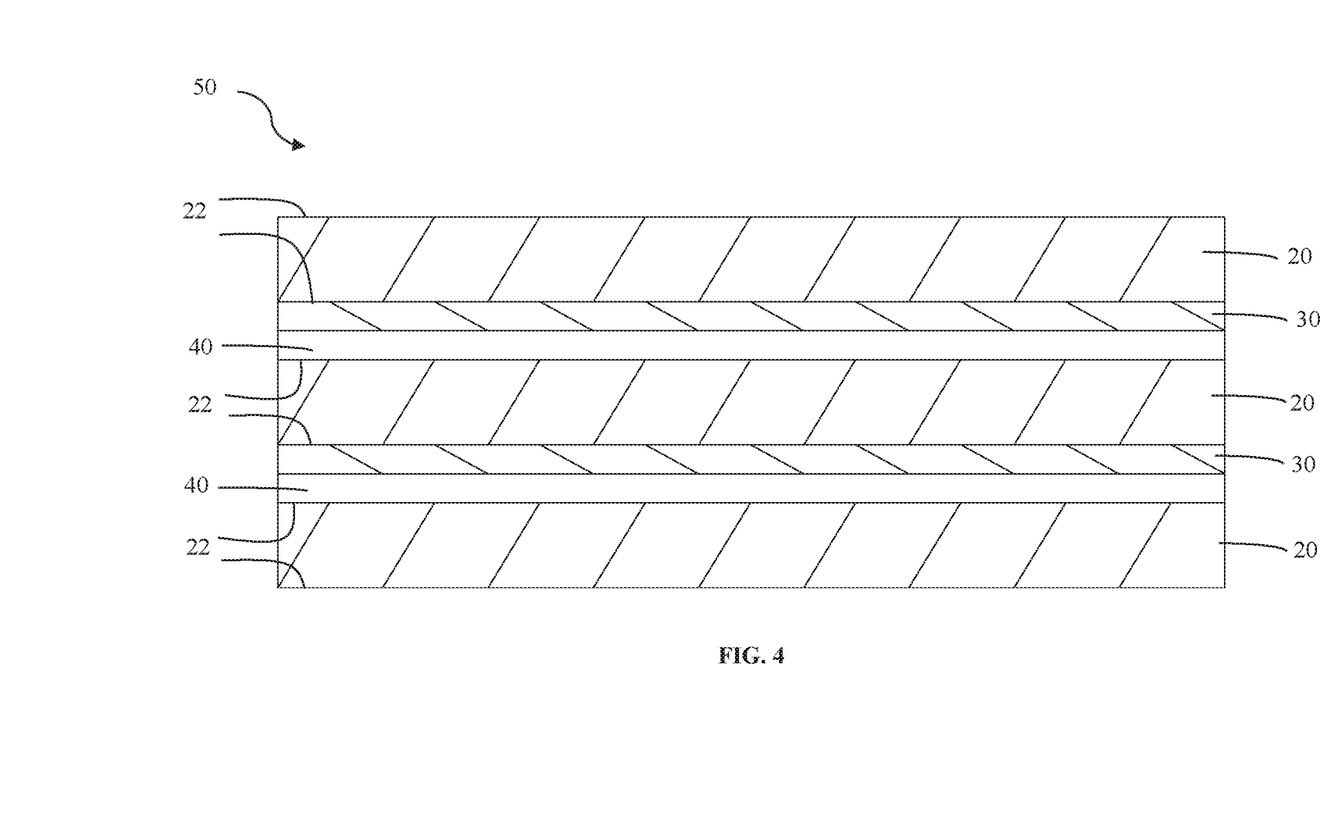
FIG. 4 is a schematic of a laminate including a coated substrate of FIG. 1 according to embodiments.

In the embodiment depicted in FIG. 4, the laminate 50 includes three substrates 20. Each of the two substrates 20 positioned on the exterior of the laminate 50 are coated with a coating 30 on one side 22. One or both of the substrates 20 may be constructed of float glass and the coating 30 may be applied on the air side 22a of each substrate 20, the tin side 22b of each substrate 20, or the air side 22a of one substrate 20 and the tin side 22b of the other substrate 20. The substrate 20 positioned on the interior of the laminate 50 is coated with a coating 30 on each side 22. The substrate 20 positioned on the interior of the laminate 50 may be constructed of float glass and the coating 30 may be applied on the air side 22a and the tin side 22b.

Each of the coating 30 and the ionomeric layer 40 may adhere to the surface to which each is applied. Without being limited to any mechanism or mode of action, the ionomeric layer 40 may adhere to the substrate 20 via attractive electrostatic forces between the ionic copolymer of the ionomeric layer and the polar surface of a glass substrate 20. The level of adhesion between the ionomeric layer 40 and the substrate 20 may be higher when the substrate 20 is a coated substrate 10.

Laminates 50 disclosed herein may include ceramic enamel laminates. Ceramic enamel laminates may include, for example, bismuth-based borosilicates or zinc-based borosilicates. In ceramic enamel laminates, enamel paints are fired onto a glass substrate to form a permanent bond. The binder for the enamels includes glass and becomes part of glass substrate. Colors, patterns, graphics, and text can be added to ceramic enamel laminates. Ceramic enamel laminates generally do not blister, crack, evolve gases or other chemicals, fade, stain, or discolor.

Laminates 50 disclosed herein may be used for applications in, for example, the construction and automobile manufacturing industries. In automobile manufacturing, the laminates may form windshields and windows. In construction, the laminates may form windows, including hurricane-resistant or bomb-blast-resistant windows; doors, including hurricane-resistant or bomb-blast-resistant doors; skylights, including hurricane-resistant skylights; facades, including bomb-blast-resistant or minimally supported facades; structural flooring, stairs, walkways, and pedestrian bridges; and minimally supported and open-edged railings and canopies.

The instant disclosure differs from conventional laminates to which an ionomeric layer 40 is not applied or is applied with low adhesion levels. In typical laminates comprising a float glass substrate 20, ionomeric layers 40 are not applied to the air side 22a of the float glass or are applied with low adhesion levels. Similarly, in typical laminates, while the adhesion of ionomeric layers 40 to the tin side 22b of float glass generally meets industry standards, the adhesion levels may be inconsistent. As disclosed herein, the inventors have found that applying a coating 30 including an adhesion promoter to either or both sides 22a, 22b (collectively, 22) of a substrate 20 improves the adhesion of the ionomeric layer 40 to each of the air side 22a and the tin side 22b. In some implementations, applying a coating 30 including an adhesion promoter to a substrate 20 provides a more consistent adhesion level compared to laminates prepared without the coating 30. In some implementations, and in contrast to the present state of the art, adhesion of an ionomeric layer 40 to the air side 22a of a coated substrate 10 is higher than to the tin side 22b of the coated substrate 10.

Applying a coating 30 including an adhesion promoter to a substrate 20 reduces or prevents weakening of the adhesive bond between the ionomeric layer 40 and the substrate 20 and reduces or prevents delamination of the laminate 50. A coated substrate 10 adheres to an ionomeric layer 40 better, i.e., with a higher adhesion level, than an uncoated substrate 20 adheres to the same ionomeric layer 40. The improved adhesion level is observable including after prolonged use in humid or wet conditions and after exposure to soft or salt water.

Compared to laminates of uncoated substrates, laminates 50 including coated substrates 10 may demonstrate one or more of improved peel strength, improved pummel performance, improved cyclic wind pressure loading performance, improved resistance to high winds including hurricane-force winds, and improved bullet resistance performance.

Applying a coating 30 including an adhesion promoter to a substrate 20 may permit greater laminate production flexibility compared to producing laminates without a coating 30. In some examples, the use of a coating 30 permits the use of wash water other than deionized water during the production process. The utilization of, for example, tap water instead of deionized water may reduce the production cost of laminates 50 that include a coated substrate 10 compared to laminates 50 that do not include a coated substrate 10. In some example, the use of a coating 30 permits the use of substrates 10 having a wider range of ages and processing histories compared to substrates 10 that are not treated with a coating 30. The utilization of substrates 10 with variable ages and processing histories may reduce the production cost of the resulting laminates 50.

Methods of Forming Laminates

Laminates 50 may be formed according to a method that includes at least the following steps: (1) heating the assembled substrates 20, coating 30, and ionomeric layer 30 via an IR radiant or convective device for a first, short period of time; (2) passing the assembly into a pressure nip roll for a first de-airing; (3) heating the assembly for a short period of time to about 60° C. to about 120° C. to give the assembly enough temporary adhesion to seal the edge of the ionomeric layer; (4) passing the assembly into a second pressure nip roll to further seal the edge of the ionomeric layer and permit further handling; and (5) autoclaving the assembly at temperatures between 130° C. and 150° C. and pressures between 150 psig and 200 psig for about 15 to 300 minutes. Alternatives to steps (1) through (4) above for de-airing the ionomeric layer-substrate interface include vacuum bag and vacuum ring processes.

EXAMPLES

Example 1-Peel Strength

Laminates of float glass substrates having an ionomeric interlayer (0.03 inch thick) were tested in 90-degree peel adhesion tests with inch-wide strips using an Instron 5960 series dual column mechanical testing system and in accordance with construction industry standards. Float glass coated with a TiOx adhesion promoter coating (sample ID nos. 4, 5, 7, and 9 in Table 1, below) was compared to reference float glass coated with a liquid gamma-aminopropyltriethoxysilane (APTES) primer (sample ID no. 3) as well as control float glass having neither coating (sample ID nos. 1, 2, 6, and 8). Results are presented in Table 1.

TABLE 1

| ID | Glass Surface | Primer | TiOx | Enamel | (n) | Average Load (pli) | Standard Deviation |
|---|---|---|---|---|---|---|---|
| 1 | Tin | No | No | No | 12 | 13.39 | 2.18 |
| 2 | Air | No | No | No | 12 | 1.34 | 0.54 |
| 3 | Air | Yes | No | No | 12 | 5.29 | 2.57 |
| 4 | Air | No | Yes | No | 12 | 20.48 | 0.64 |
| 5 | Air | No | Yes | No | 11 | 20.81 | 1.30 |
| 6 | Air | No | No | Yes (white) | 16 | 1.52 | 0.57 |
| 7 | Air | No | Yes | Yes (white) | 16 | 22.33 | 1.06 |
| 8 | Air | No | No | Yes (black) | 15 | 1.98 | 0.62 |
| 9 | Air | No | Yes | Yes (black) | 16 | 22.24 | 0.66 |

Control laminates demonstrated a tin side peel strength of 10-15 pli and an air side peel strength of 0-5 pounds per linear inch (pli). Laminates prepared with an adhesion promoter-coated substrate demonstrated an air side peel strength of 20-25 pli.

Laminates prepared with an adhesion promoter-coated substrate had significantly improved peel strengths compared to control laminates prepared without an adhesion promoter and reference laminates prepared with APTES. Laminates prepared with an adhesion promoter-coated substrate had air side peel strengths about 15 times greater than control laminates. Laminates prepared with an adhesion promoter-coated substrate had air side peel strengths about 4 times greater than reference laminates. Results were similar when an enamel was employed.

Laminates prepared with an adhesion promoter-coated substrate had air side peel strengths with less variability (lower standard deviation) than reference laminates.

Laminates prepared with an adhesion promoter-coated substrate had air side peel strengths about 1.5 times greater than tin side peel strengths of control laminates.

Example 2-Pummel Adhesion

Laminates of float glass substrates having an ionomeric interlayer (0.03 inch thick) were tested in a modified Saflex® method that included a separate step to determine adhesion level after exposure to water. Float glass coated with a TiOx adhesion promoter coating (sample ID nos. 4, 6, and 8 in Table 2, below) was compared to reference float glass coated with a liquid APTES primer (sample ID no. 3) as well as control float glass having neither coating (sample ID nos. 1, 2, 5, and 7). Results are presented in Table 2.

TABLE 2

| ID | Glass Surface | Primer | TiOx | Enamel | Pummel Value |
|---|---|---|---|---|---|
| 1 | Tin | No | No | No | 9 |
| 2 | Air | No | No | No | 1 |
| 3 | Air | Yes | No | No | 10 |
| 4 | Air | No | Yes | No | 9 |
| 5 | Air | No | No | Yes (white) | 3 |
| 6 | Air | No | Yes | Yes (white) | 9 |
| 7 | Air | No | No | Yes (black) | 1 |
| 8 | Air | No | Yes | Yes (black) | 9 |

Laminates prepared with an adhesion promoter-coated substrate had air side pummel values about 10 times greater than control laminates prepared without an adhesion promoter. Laminates prepared with an adhesion promoter-coated substrate had air side pummel values comparable to reference laminates prepared with APTES. Results were similar when an enamel was employed.

Laminates prepared with an adhesion promoter-coated substrate had air side pummel values comparable to tin side pummel values of control laminates.

Although various representative embodiments have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present disclosure. It is intended that all matter contained in the above description or shown in the accompanying drawings shall be interpreted as illustrative only and not limiting. Changes in detail or structure may be made without departing from the spirit of the disclosure as defined in the appended claims.

Although the present disclosure has been described with reference to preferred embodiments, persons skilled in the art will recognize that changes may be made in form and detail without departing from the spirit and scope of the disclosure.

What is claimed is:

1. A coated substrate, comprising:
   a first light transmissive substrate comprising float glass and having an air major surface and a tin major surface;
   a coating disposed directly on at least a portion of the air major surface of the first substrate, the coating comprising an adhesion promoter including at least one metal oxide selected from silicon oxide, tin oxide, and titanium oxide; and
   an ionomeric resin sheet layer disposed between the coating and a second light transmissive substrate,
   wherein the coating has a thickness of about 10 Å to about 1000 Å.

2. The coated substrate of claim 1, wherein the coating has a thickness of about 100 Å to about 180 Å.

3. The coated substrate of claim 1, wherein the second light transmissive substrate comprises float glass.

4. The coated substrate of claim 1, further including a second coating disposed on at least a portion of the tin major surface of the first substrate.

5. A light transmissive laminate, comprising:
   at least a first light transmissive substrate and a second light transmissive substrate, each substrate having a first major surface and a second major surface wherein the first light transmissive substrate comprises float glass having an air major surface and a tin major surface;
   a coating disposed directly on at least a portion of the air major surface of the first substrate, the coating comprising an adhesion promoter including at least one metal oxide selected from silicon oxide, tin oxide, and titanium oxide; and
   an ionomeric layer disposed on the coating between the coating and the second light transmissive substrate.

6. The laminate of claim 5, wherein the ionomeric layer comprises a thermoplastic polymer.

7. The laminate of claim 5, wherein the second light transmissive substrate comprises float glass.

8. A method of making the coated substrate of claim 1, the method comprising:
   sputtering the adhesion promoter onto the air major surface of the first light transmissive substrate,
   wherein the adhesion promoter includes at least one metal oxide selected from silicon oxide, tin oxide, and titanium oxide.

9. The method of claim 8, wherein the sputtering is by magnetron sputter vacuum deposition.

10. The method of claim 8, wherein the adhesion promoter is also sputtered onto the tin major surface.

* * * * *